United States Patent
Cho et al.

(10) Patent No.: US 10,136,387 B2
(45) Date of Patent: Nov. 20, 2018

(54) METHOD AND APPARATUS FOR CONFIGURING EVENT-TRIGGERED DRX IN WIRELESS COMMUNICATION SYSTEM

(71) Applicant: LG ELECTRONICS INC., Seoul (KR)

(72) Inventors: Heejeong Cho, Seoul (KR); Hyunsoo Ko, Seoul (KR); Hyeyoung Choi, Seoul (KR); Ilmu Byun, Seoul (KR); Kungmin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 187 days.

(21) Appl. No.: 14/924,533

(22) Filed: Oct. 27, 2015

(65) Prior Publication Data

US 2016/0127994 A1 May 5, 2016

Related U.S. Application Data

(60) Provisional application No. 62/073,018, filed on Oct. 31, 2014.

(51) Int. Cl.
| | | |
|---|---|---|
| *H04W 52/02* | (2009.01) | |
| *H04W 56/00* | (2009.01) | |
| *H04W 84/02* | (2009.01) | |
| *H04W 36/00* | (2009.01) | |
| *H04W 36/14* | (2009.01) | |
| *H04W 36/22* | (2009.01) | |

(52) U.S. Cl.
CPC ... *H04W 52/0222* (2013.01); *H04W 56/0015* (2013.01); *H04W 36/0083* (2013.01); *H04W 36/14* (2013.01); *H04W 36/22* (2013.01); *H04W 84/02* (2013.01); *Y02D 70/00* (2018.01); *Y02D 70/1224* (2018.01); *Y02D 70/1242* (2018.01); *Y02D 70/1262* (2018.01); *Y02D 70/142* (2018.01); *Y02D 70/146* (2018.01); *Y02D 70/24* (2018.01)

(58) Field of Classification Search
CPC ......... H04W 52/0222; H04W 56/0015; H04W 84/02; H04W 36/0083; H04W 36/14; H04W 36/22; Y02D 70/1262; Y02D 70/24; Y02D 70/1242; Y02D 70/1224; Y02D 70/142; Y02D 70/146; Y02D 70/00
See application file for complete search history.

(56) References Cited

U.S. PATENT DOCUMENTS

| | | | | |
|---|---|---|---|---|
| 2007/0076696 A1* | 4/2007 | An | ................ | H04L 29/06027 370/352 |
| 2007/0232341 A1* | 10/2007 | Sakata | ................ | H04L 1/0026 455/509 |
| 2008/0090573 A1* | 4/2008 | Kim | ................ | H04W 36/08 455/436 |

(Continued)

*Primary Examiner* — Chirag G Shah
*Assistant Examiner* — Joshua Smith
(74) *Attorney, Agent, or Firm* — Lee Hong Degerman Kang & Waimey (57) ABSTRACT

A method and apparatus for suspending a discontinuous reception (DRX) in a wireless communication system is provided. A user equipment (UE) receives a DRX suspend configuration including a DRX suspend triggering condition from a base station (BS), detects an occurrence of the DRX suspend triggering condition, performs an action according to the DRX suspend triggering condition, and suspends a DRX.

12 Claims, 12 Drawing Sheets

(56) References Cited

U.S. PATENT DOCUMENTS

| | | | |
|---|---|---|---|
| 2008/0198795 A1* | 8/2008 | Kim | H04W 76/048 370/328 |
| 2009/0180414 A1* | 7/2009 | Maeda | H04B 7/2643 370/311 |
| 2009/0213800 A1* | 8/2009 | Lee | H04L 12/12 370/329 |
| 2010/0111039 A1* | 5/2010 | Kim | H04W 76/048 370/331 |
| 2010/0130137 A1* | 5/2010 | Pelletier | H04W 72/04 455/68 |
| 2011/0275378 A1* | 11/2011 | Kwon | H04W 36/30 455/437 |
| 2012/0014477 A1* | 1/2012 | Ko | H04B 7/0613 375/299 |
| 2012/0243417 A1* | 9/2012 | Henttonen | H04W 76/046 370/241 |
| 2013/0229931 A1* | 9/2013 | Kim | H04W 24/10 370/252 |
| 2014/0126400 A1* | 5/2014 | Chhabra | H04W 52/0258 370/252 |
| 2015/0009874 A1* | 1/2015 | Edara | H04W 52/0225 370/311 |
| 2015/0018010 A1* | 1/2015 | Fischer | H04W 4/023 455/456.2 |

* cited by examiner

METHOD AND APPARATUS FOR CONFIGURING EVENT-TRIGGERED DRX IN WIRELESS COMMUNICATION SYSTEM

CROSS-REFERENCE TO RELATED APPLICATIONS

Pursuant to 35 U.S.C. § 119(e), this application claims the benefit of U.S. Provisional Patent Application No. 62/073,018, filed on Oct. 31, 2014, the contents of which are hereby incorporated by reference herein in its entirety.

BACKGROUND OF THE INVENTION

Field of the Invention

The present invention relates to wireless communications, and more particularly, to a method and apparatus for configuring an event-triggered discontinuous reception (DRX) in a wireless communication system.

Related Art

With the recent trend of increasing high-rate data traffic, fifth generation mobile communication technologies are in discussion for their realistic and efficient backup. One of requirements for fifth generation mobile communication technologies is the interworking between heterogeneous wireless communication systems, particularly between a cellular system and a wireless local area network (WLAN) system. The cellular system may be one of a 3$^{rd}$ generation partnership project (3GPP) long-term evolution (LTE) system, a 3GPP LTE-A (advanced) system, and an institute of electrical and electronics engineers (IEEE) 802.16 (WiMax, WiBro) system. The WLAN system may be an IEEE 802.11 (Wi-Fi) system. In particular, WLAN is a wireless communication system that is commonly used for various user equipments, and thus, the cellular-WLAN interoperation is a high-priority convergence technique. Offloading by the cellular-WLAN interoperation may increase the coverage and capacity of the cellular system.

In other words, the fifth-generation mobile communication system may use multiple radio access technologies (RATs) in a converging manner through the interoperation between heterogeneous wireless communication systems. Each entity in the plurality of RATs constituting a fifth-generation mobile communication system may exchange information therebetween, and accordingly, the optimal communication system may be provided to a user in the fifth-generation mobile communication system. Among the plurality of RATs constituting the fifth-generation mobile communication system, a specific RAT may operate as a primary RAT system, and another specific RAT may operate as a secondary RAT system. That is, the primary RAT system may mainly play a role to provide a communication system to a user in the fifth-generation mobile communication system, while the secondary RAT system may assist the primary RAT system. In general, a 3GPP LTE(-A) or IEEE 802.16 cellular system with relatively broad coverage may be a primary RAT system, and a Wi-Fi system with relatively narrower coverage may be a secondary RAT system.

A discontinuous reception (DRX) is a technique for saving a battery of a user equipment (UE) by disabling a receiver when the UE cannot detect data. Advantageously, since the receiver can be operated rapidly with minimum signaling, a signaling task and a user experience can be significantly improved. However, the conventional DRX operating on a timer basis has a disadvantage in that a network cannot always transmit data and/or control signals to the UE.

Accordingly, a new type of DRX may be required instead of the timer-based DRX.

SUMMARY OF THE INVENTION

The present invention provides a method and apparatus for configuring an event-triggered discontinuous reception (DRX) in a wireless communication system. The present invention provides a method and apparatus for operating with an event-triggered DRX in a converged communication system of a cellular system and a Wi-Fi system. The present invention provides a method and apparatus for suspending DRX according to a DRX suspend triggering condition.

In an aspect, a method for suspending, by a user equipment (UE), a discontinuous reception (DRX) in a wireless communication system is provided. The method includes receiving a DRX suspend configuration including a DRX suspend triggering condition from a base station (BS), detecting an occurrence of the DRX suspend triggering condition, performing an action according to the DRX suspend triggering condition, and suspending a DRX.

In another aspect, a user equipment (UE) is provided. The UE includes a memory, a transceiver, and a processor coupled to the memory and the transceiver, and configured to control the transceiver to receive a discontinuous reception (DRX) suspend configuration including a DRX suspend triggering condition from a base station (BS), detect an occurrence of the DRX suspend triggering condition, perform an action according to the DRX suspend triggering condition, and suspend a DRX.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11 (Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE.

3GPP LTE(-A) and IEEE 802.11 are chiefly described as an example in order to clarify the description, but the technical spirit of the present invention is not limited to 3GPP LTE(-A) and IEEE 802.11.

Figure 1:
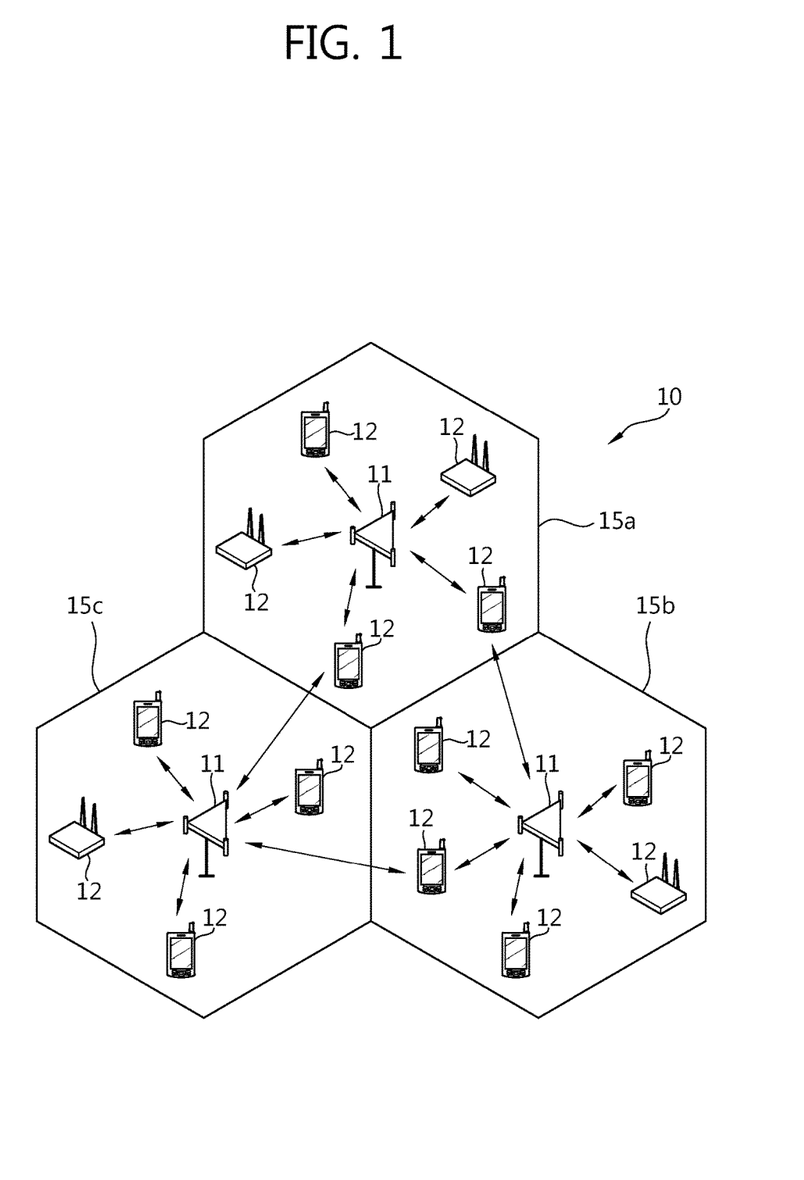
FIG. 1 shows a cellular system.

FIG. 1 shows a cellular system. Referring to FIG. 1, the cellular system 10 includes one or more base stations (BSs) 11. The BSs 11 provide communication services to respective geographical areas (in general called 'cells') 15a, 15b, and 15c. Each of the cells can be divided into a number of areas (called 'sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE generally belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
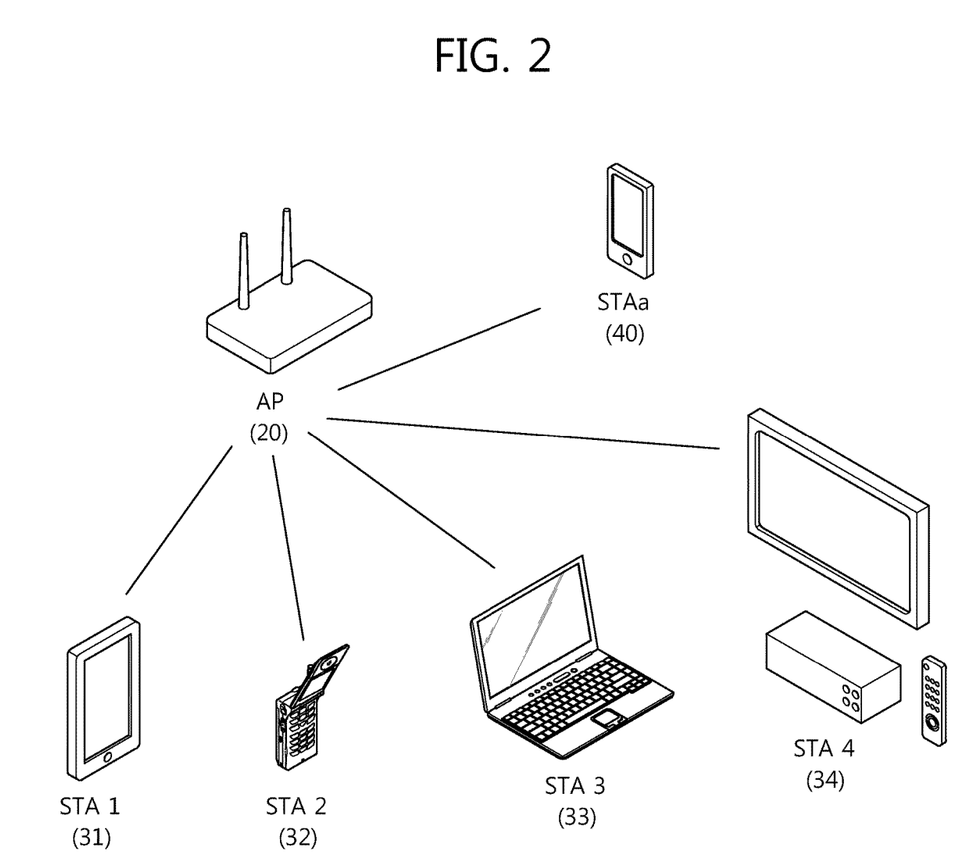
FIG. 2 shows a wireless local area network (WLAN) system.

FIG. 2 shows a wireless local area network (WLAN) system. The WLAN system may also be referred to as a Wi-Fi system. Referring to FIG. 2, the WLAN system includes one access point (AP) 20 and a plurality of stations (STAs) 31, 32, 33, 34, and 40). The AP 20 may be linked to each STA 31, 32, 33, 34, and 40 and may communicate therewith. The WLAN system includes one or more basic service sets (BSSs). The BSS is a set of STAs that may be successfully synchronized with each other and may communicate with each other, and does not mean a specific region.

An infrastructure BSS includes one or more non-AP stations, APs that provide a distribution service (DS), and a DS that links a plurality of APs with each other. In the infrastructure BSS, an AP manages non-AP STAs of the BSS. Accordingly, the WLAN system shown in FIG. 2 may include an infrastructure BSS. In contrast, an independent BSS (IBSS) is a BSS that operates in ad-hoc mode. The IBSS does not include an AP and thus lacks a centralized management entity. That is, in the IBSS, the non-AP STAs are managed in a distributed manner. The IBSS may have all the STAs constituted of mobile STAs and is not allowed to access the distribution system, thus achieving a self-contained network.

The STA is random functional medium that includes a physical layer interface for a wireless medium and an media access control (MAC)) observing IEEE 802.11 standards, and in its broader concepts, it includes both the AP and non-AP station.

The non-AP STA is an STA, not an AP. The non-AP STA may also be referred to as a mobile terminal, a wireless device, a wireless transmit/receive unit (WTRU), a user equipment (UE), a mobile station (MS), a mobile subscriber unit or simply as a user. Hereinafter, for ease of description, the non-AP STA denotes an STA.

The AP is a functional entity that provides access to a distribution system via a wireless medium for an STA associated with the AP. In the infrastructure BSS including an AP, communication between STAs is basically done via an AP, but in case a direct link is established, direct communication may be achieved between STAs. The AP may also be referred to as a central controller, a base station (BS), a NodeB, a base transceiver system (BTS), or a site controller.

A plurality of infrastructure BSSs may be linked with each another through a distribution system. The plurality of BSSs linked with each another is referred to as an extended service set (ESS). The APs and/or STAs included in the ESS may communicate with each other, and in the same ESS, an STA may move from one BSS to another, while in seamless communication.

Figure 3:
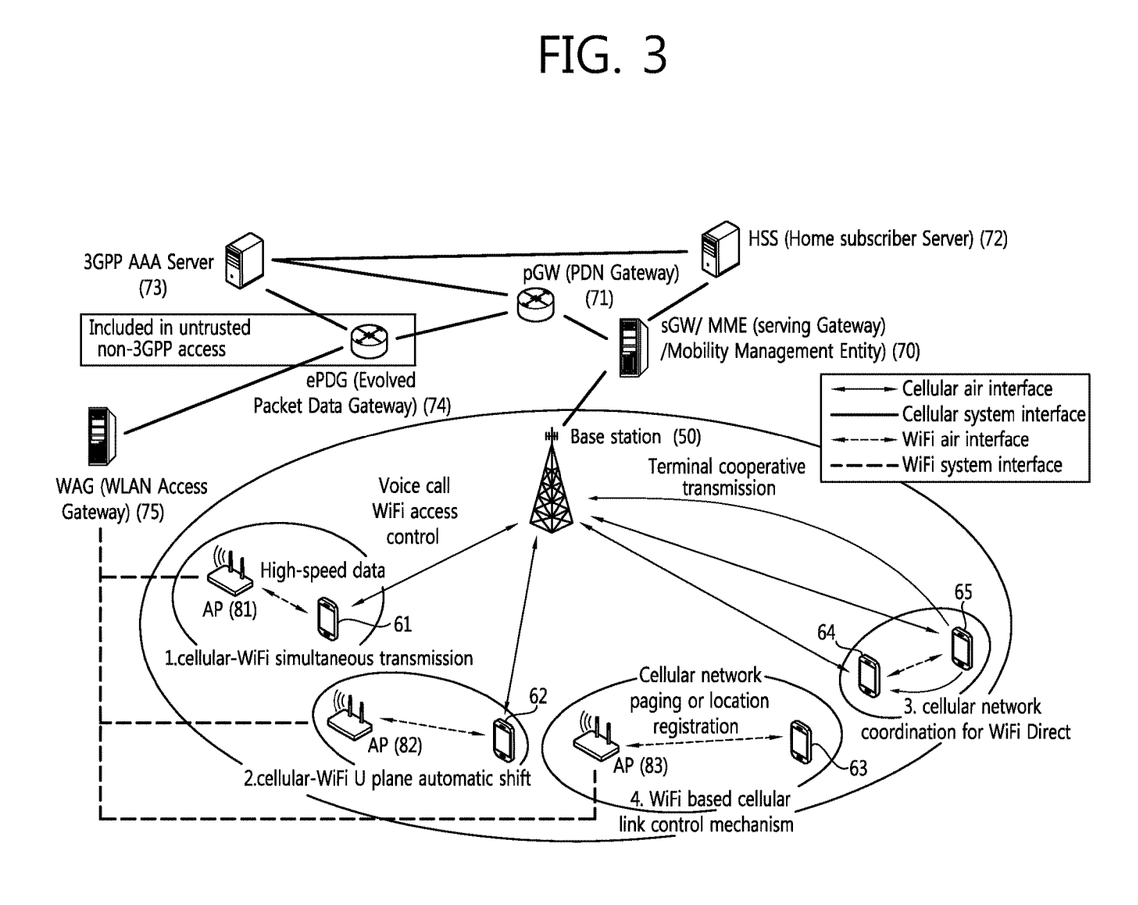
FIG. 3 shows an example of a scenario of a converged communication system of a cellular system and a Wi-Fi system.

FIG. 3 shows an example of a scenario of a converged communication system of a cellular system and a Wi-Fi system.

It is assumed in FIG. 3 that the cellular system operates as a primary RAT system of the converged communication system, and the Wi-Fi system operates as a secondary RAT system of the converged communication system. Further, the cellular system may be a 3GPP LTE(-A) system. Hereinafter, for ease of description, it is assumed that the primary RAT system of the converged communication system is a 3GPP LTE(-A) system, and the secondary RAT system of the communication system is an IEEE 802.11 system, i.e., a Wi-Fi system. However, embodiments of the present invention are not limited thereto.

Referring to FIG. 3, there are a plurality of general devices 61, 62, 63, 64, and 65 in the coverage of the cellular base station 50. Each of the general devices 61, 62, 63, 64, and 65 may be a user equipment in a cellular system. The cellular base station 50 may communicate with each of the general devices 61, 62, 63, 64, and 65 via a cellular radio interface. For example, the cellular base station 50 may perform voice call communication with each of the general devices 61, 62, 63, 64, and 65 or may control access of each general device 61, 62, 63, 64, and 65 to a Wi-Fi system.

The cellular base station 50 is connected to a serving gateway (S-GW)/mobility management entity (MME) 70 through a cellular system interface. The MME contains a user equipment's access information or information on a user equipment's capability, and such information may be mainly used for mobility management. The MME is in charge of a control plane. The S-GW is a gateway having an E-UTRAN as an end point. The S-GW is in charge of a user plane. The S-GW/MME 70 is connected to a packet data network (PDN) gateway (P-GW) 71 and a home subscriber server (HSS) 72 through the cellular system interface. The PDN-GW is a gateway having a PDN as an end point.

The P-GW 71 and the HSS 72 are connected to a 3GPP access authentication authorization (AAA) server 73 through the cellular system interface. The P-GW 71 and the 3GPP AAA server 73 may be connected to an evolved packet data gateway (ePDG) 74 through the cellular system interface. The ePDG 74 may be included only in un-trusted non-3GPP access. The ePDG 74 may be connected to a WLAN access gateway (WAG) 75. The WAG 75 may be in charge of a P-GW in a Wi-Fi system.

Meanwhile, a plurality of APs 81, 82, and 83 may be present in the coverage of the cellular base station 50. Each of the APs 81, 82, and 83 may have coverage which is shorter than that of the cellular base station 50. Each of the APs 81, 82, and 83 may communicate with general devices 61, 62, and 63 that are present in its coverage through a Wi-Fi radio interface. In other words, the general devices 61, 62, and 63 may communicate with the cellular base station 50 and/or APs 81, 82, and 83. Communication methods of the general devices 61, 62, and 63 are as follows:

1) Cellular/Wi-Fi simultaneous radio transmission: the general device 61 may perform high-speed data communication with the AP 81 through a Wi-Fi radio interface while communicating with the cellular base station 50 through a cellular radio interface.

2) Cellular/Wi-Fi user plane automatic shift: the general device 62 may communicate with one of the cellular base station 50 and the AP 82 by user plane automatic shift. At this time, the control plane may be present in both the cellular system and the Wi-Fi system or only in the cellular system.

3) Terminal cooperative transmission: the general device 64 operating as a source device may directly communicate with the cellular base station 50 through a cellular radio interface or may indirectly communicate with the cellular base station 50 through a general device 65 operating as a cooperative device. That is, the cooperative device 65 may assist the source device 64 so that the source device 64 may indirectly communicate with the cellular base station 50 through itself. The source device 64 and the cooperative device 65 communicate with each other through a Wi-Fi radio interface.

4) Wi-Fi-based cellular link control mechanism: the AP 83 may perform a cellular link control mechanism such as paging or location registration of a network for the cellular general device 63. The general device 63 is not directly connected to the cellular base station 50 and may directly communicate with the cellular base station 50 thorough the AP 83.

Each of the APs 81, 82, and 83 is connected to the WAG 75 through a Wi-Fi system interface.

Figure 4:
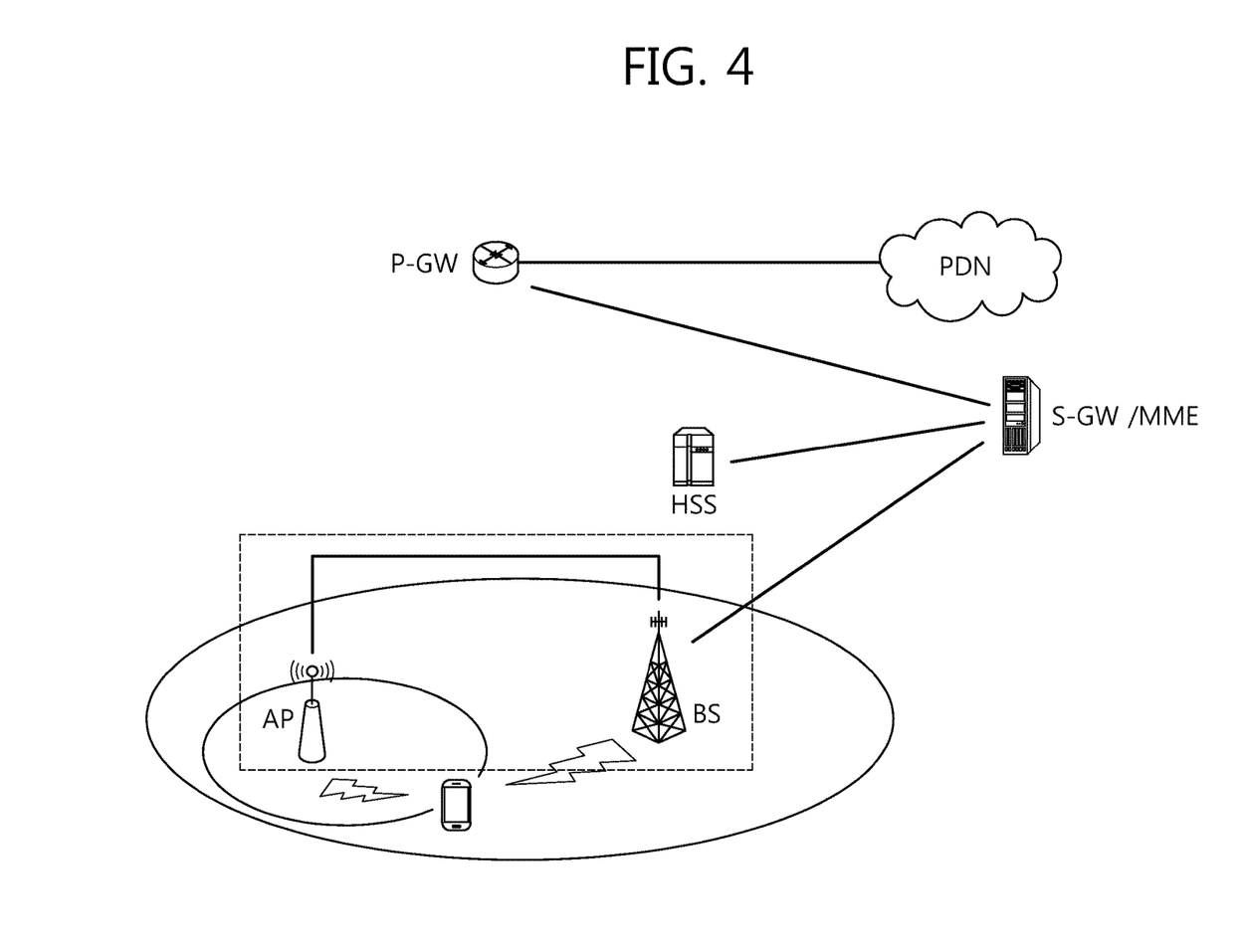
FIG. 4 shows an example of a tightly coupled cellular network and a Wi-Fi network.

FIG. 4 shows an example of a tightly coupled cellular network and a Wi-Fi network. Referring to FIG. 4, in the tightly coupled cellular network and the Wi-Fi network, a BS of the cellular network is connected to a P-GW and a PDN via the S-GW/MME of FIG. 3. Meanwhile, an AP is connected to the BS, and is connected to the P-GW and the PDN via the same interface as the BS. This is different from an aspect in which the AP is connected to the P-GW via the WAG of FIG. 3. That is, in the tightly coupled cellular network and the Wi-Fi network, the BS and the AP are collocated or connected.

Figure 5:
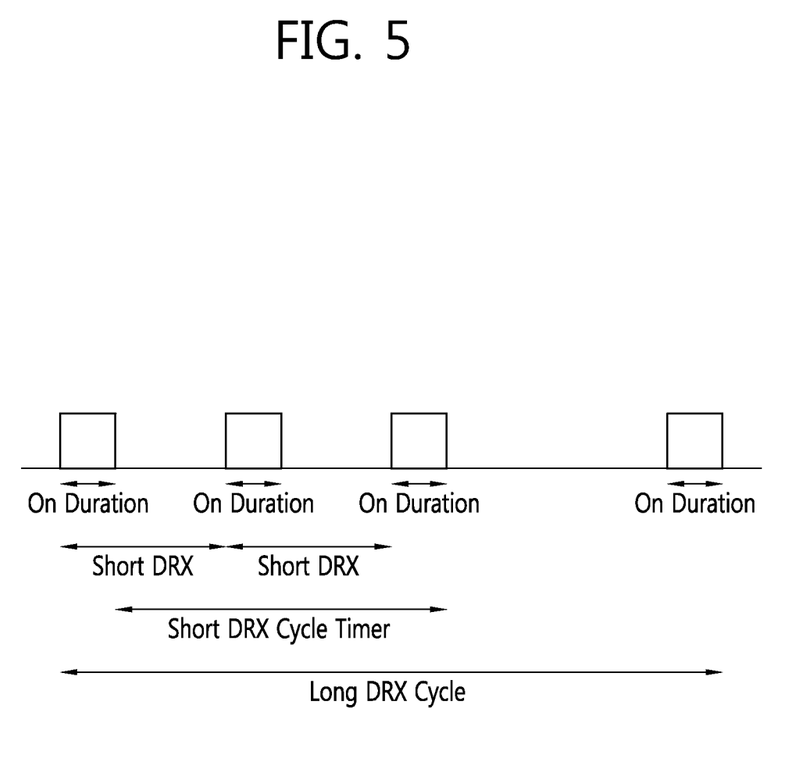
FIG. 5 shows an example of a method of operating a DRX.

FIG. 5 shows an example of a method of operating a DRX. Referring to FIG. 5, a UE is on only during some on-durations of a DRX cycle (i.e., an active state), and is off in the remaining durations of the DRX cycle (i.e., an inactivate state). When the UE is under a short DRX condition, the on-duration is set in a long DRX cycle, and a short DRX cycle is also set additionally. The UE performs the DRX according to the short DRX cycle during a short DRX cycle timer is running, and performs the DRX according to the long DRX cycle when the short DRX cycle timer expires. Table 1 shows various parameters for the DRX operation. The various parameters for the DRX operation may be transmitted to the UE by being included in a DRX configuration.

TABLE 1

| DRX Parameter | Description |
| --- | --- |
| DRX Cycle | Specifies the periodic repetition of an active state that last for On duration |
| On Duration timer | Specifies how many subframes the UE should be in active state when a new DRX cycle starts |
| DRX Inactivity timer | Specifies how many PDCCH subframes after successfully decoding a PDCCH the UE must remain active. |
| DRX Retransmission timer | Specifies the maximum number of consecutive PDCCH subframes the UE should remain active to wait an incoming retransmission after the first available retransmission time |
| DRX Short Cycle | Specifies the periodic repetition of an active state when the UE is under short DRX condition, it's a sort of discontinuous inactivity timer |
| DRX Short Cycle timer | Specifies the consecutive number of subframes the UE must the UE shall follow the short DRX cycle after the DRX Inactivity Timer has expired |
| longDRX-CycleStartOffset | =drxStartOffset |

In a Wi-Fi network, the UE may acquire information of a neighbor AP to gain information about neighbors of an associated AP to be used as potential roaming candidates. When the UE transmits a neighbor report request to the associated AP, the associated AP may transmit the neighbor report to the UE and thus may transmit information of the neighbor AP to the UE. In addition, in a cellular network, the UE may acquire information of a neighbor cell. A serving BS may transmit a radio resource control (RRC) connection reconfiguration message to the UE, and thus may transmit the information of the neighbor cell to the UE.

In the Wi-Fi network, a measurement and report operation of the UE is as shown in Table 2 below.

TABLE 2

|  | Associated AP | Neighbor APs |
| --- | --- | --- |
| Measurement | ○ | ○ (autonomously performed by UE) |
| Report | ○ | X |

Referring to Table 2, the UE performs the measurement and report on the associated AP. On the other hand, as to the neighbor AP, the measurement is performed by the UE autonomously, and the report thereof is not performed. Accordingly, a handover is determined and performed by the UE on the basis of a measurement result. This may be called a mobile initiated handover (MIHO).

In the cellular network, the measurement and report operation of the UE is as shown in Table 3 below.

TABLE 3

| | Serving cell | Neighbor cells |
|---|---|---|
| Measurement | ○ | ○ (performed based on BS configuration) |
| Report | ○ | ○ (performed based on BS configuration) |

Referring to Table 3, the UE performs the measurement and report on the serving cell, and also performs the measurement and report on the neighbor cell according to a BS configuration. Therefore, a handover is determined and performed by the BS on the basis of a measurement result reported from the UE. This may be called a network initiated handover (NIHO).

When the MIHO and the NIHO are compared with each other, a well-known experimental result shows that a handover blocking probability of the NIHO is about 1.5 to 4 times lower than a handover blocking probability of the MIHO. In addition, in the NIHO, since a handover target (e.g., another AP, cellular BS) is determined by a network, the network may switch a data session to the target in a handover preparation step. Accordingly, a handover interrupt time may be decreased.

However, in the NIHO, in order to determine which RAT will be used by the network, the UE needs to know a channel state of an RAT to which the UE is currently having access. This may be particularly required in the tightly coupled cellular network and the Wi-Fi network. In addition, in a case where the RAT (e.g., Wi-Fi network) to which the UE is currently having access is directly used without alteration, in order for the network to determine a target AP, there is a need to know a measurement result on not only an associated AP but also a neighbor AP. A measurement environment configuration and result report on the associated AP may be delivered from the UE to the serving BS via the associated AP. When it is delivered from the UE to the associated AP, the conventional method (i.e., measurement report) of the Wi-Fi network may be directly applied, and when it is delivered from the associated AP to the serving BS, it may be delivered through a network interface between the Wi-Fi network and the cellular network.

Meanwhile, when the UE delivers the measurement environment configuration and result report on the neighbor AP to the serving BS, a method of delivering it from the UE to the associated AP is not defined in the Wi-Fi network at present. Therefore, when the measurement result of the associated AP is decreased to below a specific threshold, the serving BS needs to configure an environment regarding which neighbor AP will be measured and/or when the measurement result will be reported, and needs to deliver the configured environment to the UE. This is to minimize UE power consumption caused by an unnecessary measurement environment configuration. However, in a case where measurement environment configuration information on the neighbor AP is delivered or a traffic handover is commanded to a UE in the conventional DRX mode operating on a timer basis, there is a problem in that the serving BS has to wait until an on-duration of the UE.

Therefore, in order to solve the aforementioned problem, an event-triggered DRX may be newly proposed according to an embodiment of the present invention. According to the event-triggered DRX proposed in the present invention, if a specific event occurs, the UE suspends the DRX and may receive data and/or control signals from the serving BS. More specifically, the BS may transmit a DRX suspend configuration including a condition for triggering the DRX suspension to the UE. Upon occurrence of the event configured by the BS, the UE may perform a corresponding action (e.g., report) and may suspend the DRX.

Figure 6:
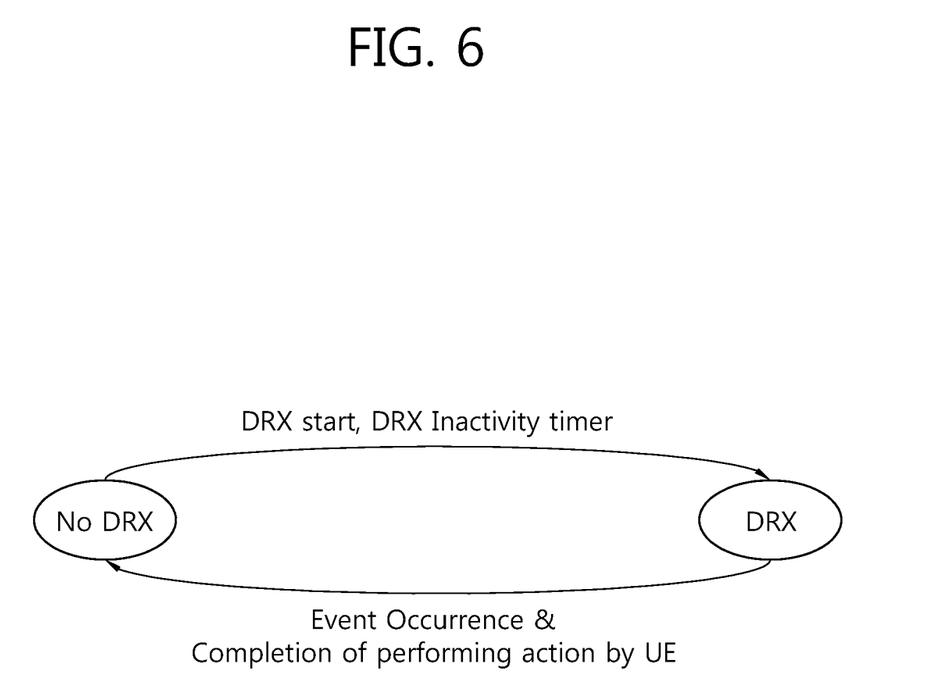
FIG. 6 shows an event-triggered DRX according to an embodiment of the present invention.

FIG. 6 shows an event-triggered DRX according to an embodiment of the present invention. Referring to FIG. 6, the DRX operates on the basis of a parameter such as a DRX start, a DRX inactivity timer, etc., in a state where the DRX does not operate. If an event occurs and a UE's action depending on the event is completely performed while operating the DRX, the UE suspends the DRX.

Table 4 shows an example of a DRX suspend configuration according to an embodiment of the present invention. The DRX suspend configuration may be included in the DRX configuration described in Table 1.

TABLE 4

| DRX suspend configuration | Description |
|---|---|
| Event ID List | Event list corresponding to DRX suspend triggering condition<br>B3: Associated AP becomes worse than threshold<br>B4: Neighbor AP(s) becomes offset better than associated AP<br>B5: Neighbor AP(s) becomes better than threshold<br>B6: Associated AP becomes worse than threshold 1 and neighbor becomes better than threshold2 |
| B3-Threshold | Threshold to be used in DRX suspend triggering condition for event number b3 |
| TimeToTrigger | The time during which specific criteria for the event needs to be met in order to trigger DRX suspend |
| b4-offset<br>b5-Threshold<br>b6-Threshold1<br>b6-Threshold2 | This may be explicitly configured similarly to B3-Threshold, or may directly conform to value of measurement configuration |

Figure 7:
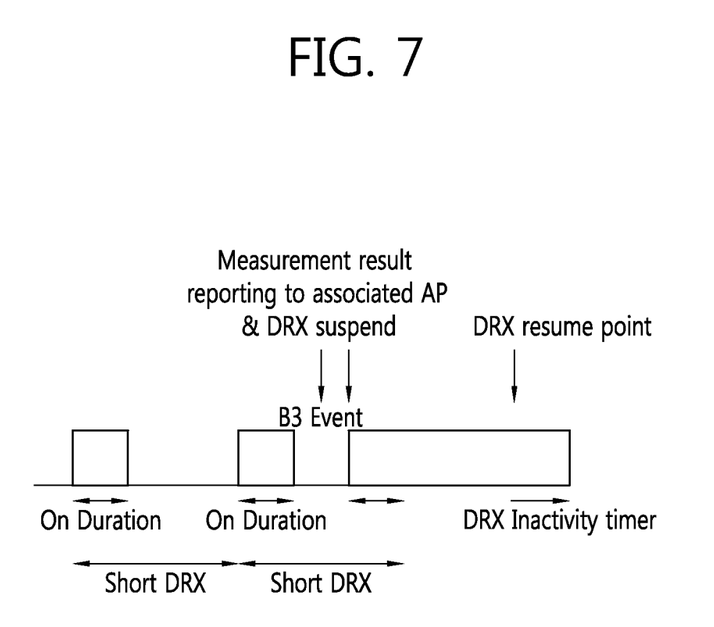
FIG. 7 shows a case where a DRX is suspended by a B3 event according to an embodiment of the present invention.

FIG. 7 shows a case where a DRX is suspended by a B3 event according to an embodiment of the present invention. Referring to FIG. 7, if the B3 event occurs, that is, if a measurement result of an associated AP becomes worse than a threshold, a UE reports the measurement result to the associated AP and suspends the DRX. Thereafter, the DRX may be resumed from a DRX resume point, and a DRX inactivity timer may run from the DRX resume point. The resumption of the DRX may be indicated by using a DRX command media access control (MAC) sub-header. In this case, a value of a logical channel ID (LCID) included in a DRX command MAC sub-header may be 11110.

Figure 8:
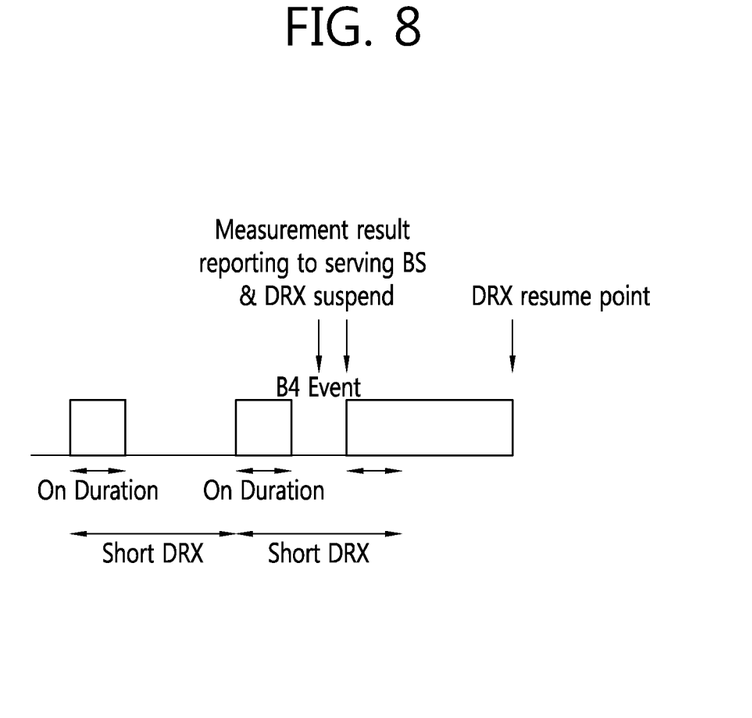
FIG. 8 shows a case where a DRX is suspended by a B4 event according to an embodiment of the present invention.

FIG. 8 shows a case where a DRX is suspended by a B4 event according to an embodiment of the present invention. Referring to FIG. 8, if the B4 event occurs, that is, if a measurement result on a neighbor AP becomes better than the measurement result by at least offset, the UE reports the measurement result to the serving BS and suspends the DRX. Thereafter, the DRX may be resumed from a DRX resume point.

Figure 9:
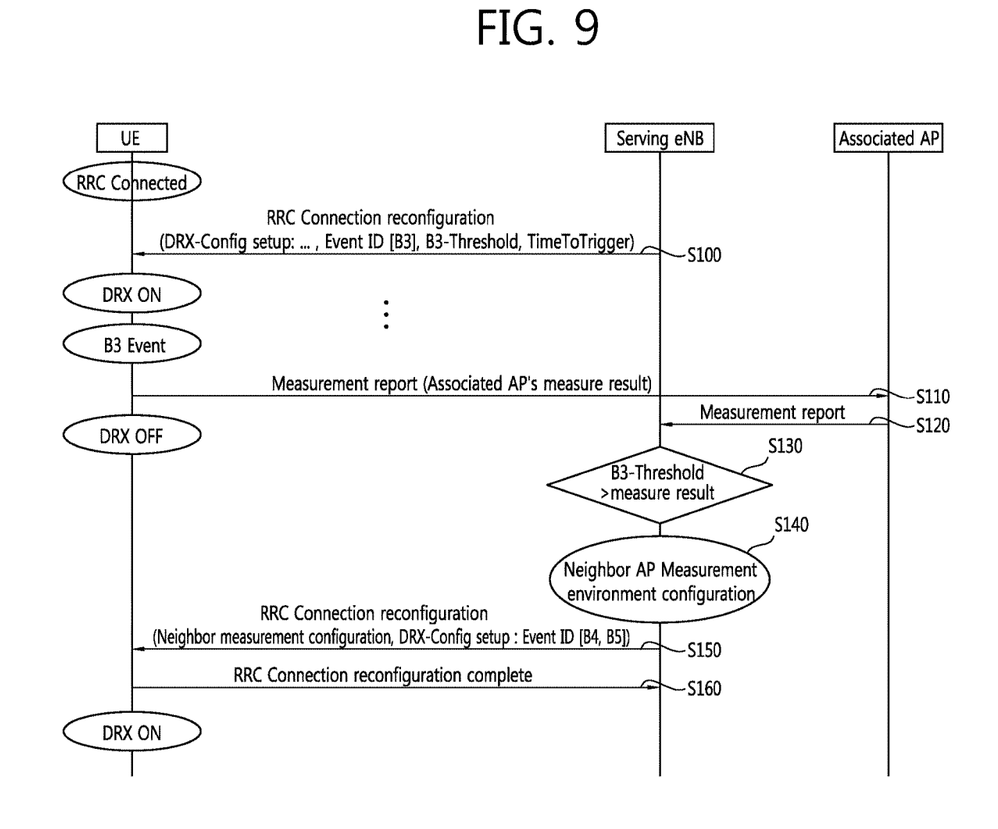
FIG. 9 shows a method of DRX suspension and neighbor AP's measurement environment configuration according to an embodiment of the present invention.

FIG. 9 shows a method of DRX suspension and neighbor AP's measurement environment configuration according to an embodiment of the present invention. The embodiment of FIG. 9 corresponds to the DRX suspension and neighbor AP's measurement environment configuration depending on a B3 event.

In step S100, a serving BS transmits an RRC connection reconfiguration message to a UE. The RRC connection reconfiguration message may include a DRX configuration. In addition, a DRX configuration includes a DRX suspend configuration. The DRX suspend configuration includes parameters such as B3 as Event ID list, B3-Threshold, and TimeToTrigger.

The B3 event occurs during the UE operates in a DRX state. Accordingly, in step S110, the UE transmits a measurement result of an associated AP to the associated AP through a measurement report. Thereafter, the UE suspends the DRX.

In step S120, the associated AP transmits the received measurement result of the associated AP to the serving BS. On the basis of the received measurement result of the associated AP, in step S130, the serving BS determines whether the B3-Threshold is greater than the measurement result of the associated AP. If the B3-Threshold is greater than the measurement result of the associated AP, in step S140, the serving BS configures a measurement environment of the neighbor AP. That is, the serving BS may configure the measurement environment on the UE and the neighbor AP without a scheduling constraint caused by the conventional DRX.

In step S150, the serving BS transmits an RRC connection reconfiguration message to the UE. The RRC connection reconfiguration message includes a neighbor measurement configuration and a DRX configuration. In addition, the DRX configuration includes a DRX suspend configuration. The DRX suspend configuration includes B4 and B5 as Event ID list. In step S160, the UE transmits an RRC connection reconfiguration complete message to the serving BS.

If the serving BS desires to resume the DRX after configuring the measurement environment of the neighbor AP, the serving BS may transmit a measurement environment configuration message including a DRX resumption announcement to the UE. If a corresponding procedure is complete according to the DRX resumption announcement, the UE resumes the DRX.

As described above, information on the neighbor AP is transmitted to the UE at the request of the UE in the conventional method, whereas information of the neighbor AP to be measured may be transmitted to the UE by a decision of the BS in the present invention. In this case, since the UE suspends the DRX according to the event-triggered DRX proposed in the present invention, the BS may configure the measurement environment on the UE and the neighbor AP without a scheduling constraint.

Figure 10:
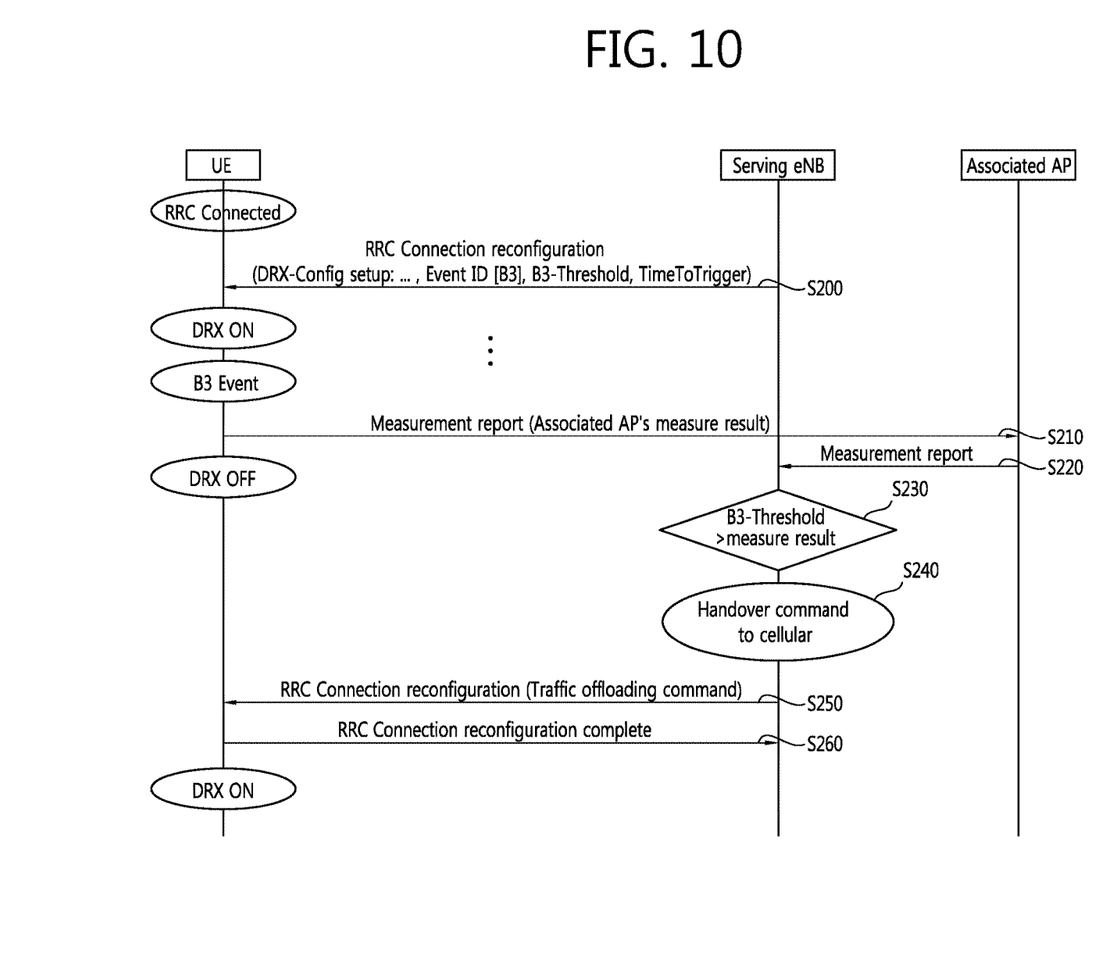
FIG. 10 shows a method of DRX suspension and traffic handover command according to an embodiment of the present invention.

FIG. 10 shows a method of DRX suspension and traffic handover command according to an embodiment of the present invention. The embodiment of FIG. 10 corresponds to the DRX suspension and traffic handover command depending on a B3 event.

In step S200, a serving BS transmits an RRC connection reconfiguration message to a UE. The RRC connection reconfiguration message may include a DRX configuration. In addition, a DRX configuration includes a DRX suspend configuration. The DRX suspend configuration includes parameters such as B3 as Event ID list, B3-Threshold, and TimeToTrigger.

The B3 event occurs during the UE operates in a DRX state. Accordingly, in step S210, the UE transmits a measurement result of an associated AP to the associated AP through a measurement report. Thereafter, the UE suspends the DRX.

In step S220, the associated AP transmits the received measurement result of the associated AP to the serving BS. On the basis of the received measurement result of the associated AP, in step S230, the serving BS determines whether the B3-Threshold is greater than the measurement result of the associated AP. If the B3-Threshold is greater than the measurement result of the associated AP, in step S240, the serving BS commands a handover to a cellular network. That is, the serving BS may command the UE to handover traffic being transmitted/received through a Wi-Fi network to the cellular network without a scheduling constraint caused by the DRX.

In step S250, the serving BS transmits an RRC connection reconfiguration message to the UE. The RRC connection reconfiguration message includes a traffic offloading command. In step S260, the UE transmits an RRC connection reconfiguration complete message to the serving BS.

If the serving BS desires to resume the DRX after commanding to handover the traffic to the cellular network, the serving BS may transmit a DRX resumption announcement to the UE. If a corresponding procedure is complete according to the DRX resumption announcement, the UE resumes the DRX.

Figure 11:
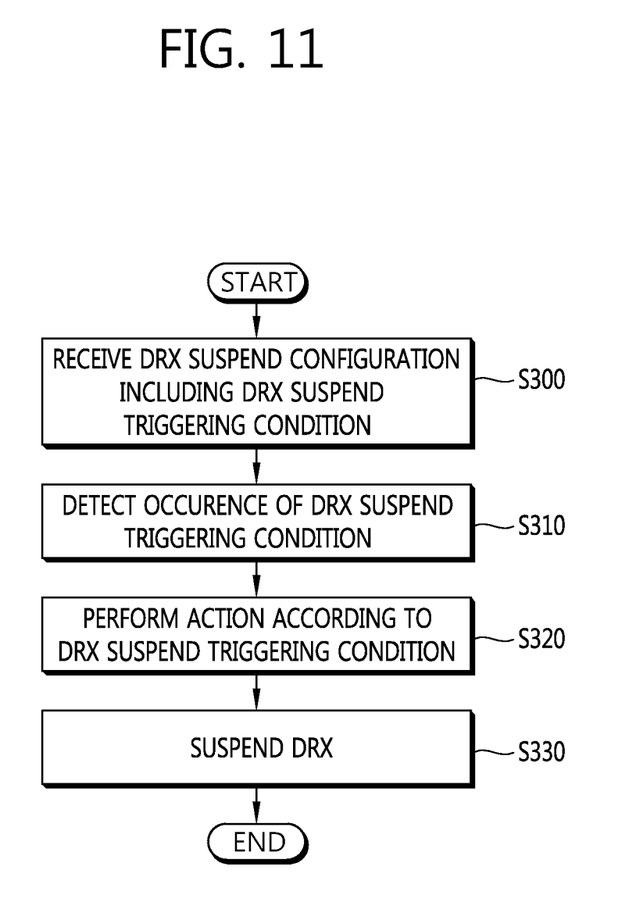
FIG. 11 shows a method for suspending a DRX according to an embodiment of the present invention.

FIG. 11 shows a method for suspending a DRX according to an embodiment of the present invention.

In step S300, the UE receives a DRX suspend configuration including a DRX suspend triggering condition from a BS. The DRX suspend triggering condition may correspond to one of events including B3 event, B4 event, B5 event or B6 event. When the DRX suspend triggering condition corresponds to the B3 event, the DRX suspend configuration may further include at least one of a time during which a specific criteria for the DRX suspend triggering condition needs to be met, or a threshold to be used in the DRX suspend triggering condition corresponding to the B3 event.

In step S310, the UE detects an occurrence of the DRX suspend triggering condition. In step S320, the UE performs an action according to the DRX suspend triggering condition. The action may correspond to reporting a measurement result of an associated AP to, e.g. the associated AP or serving BS. In step S330, the UE suspends a DRX.

The UE may further receive a neighbor AP measurement configuration from the BS. Alternatively, the UE may further receive a traffic offloading command, from a Wi-Fi network to a cellular network, from the BS. Further, the UE may receive an indication of DRX resume from the BS. The indication of DRX resume may correspond to a DRX command MAC sub-header. The UE may resume the DRX according to the indication of DRX resume.

Figure 12:
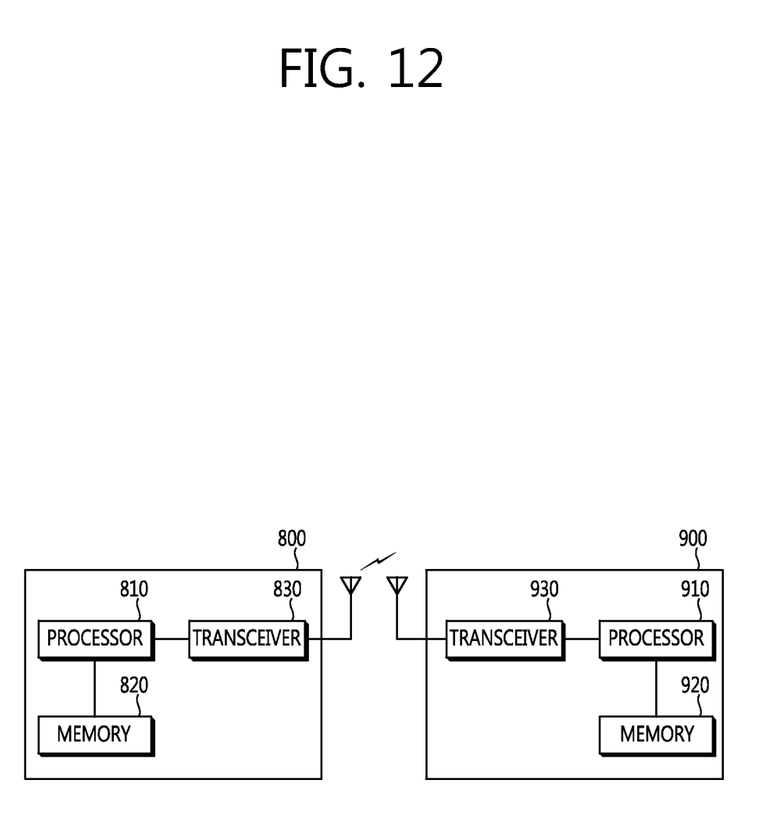
FIG. 12 shows a wireless communication system to implement an embodiment of the present invention.

FIG. 12 shows a wireless communication system to implement an embodiment of the present invention.

A BS or AP 800 includes a processor 810, a memory 820, and a transceiver 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

According to an embodiment of the present invention, by proposing the event-triggered DRX, a BS can configure measurement or traffic offloading without scheduling restriction.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for suspending, by a user equipment (UE) which is connected to a base station (BS) of a cellular network and an access point (AP) of a Wi-Fi network, a discontinuous reception (DRX) in a wireless communication system, wherein the BS and the AP are connected to each other, the method comprising:

receiving a DRX suspend configuration including a DRX suspend triggering condition and a threshold related to the DRX suspend triggering condition, wherein the DRX suspend triggering condition indicates a condition that a measurement result of an associated AP becomes less than the threshold, from the BS;

detecting an occurrence of the DRX suspend triggering condition;

reporting the measurement result of the associated AP to the associated AP when the DRX suspend triggering condition is met;

suspending the DRX;

receiving a neighbor AP measurement configuration of a neighbor AP from the BS, with the DRX suspended; and resuming the DRX, upon receiving the neighbor AP measurement configuration, wherein the neighbor AP measurement configuration includes information on which neighbor AP will be measured and when the measurement result will be reported, wherein the neighbor AP measurement configuration is determined, by the BS, to be transmitted, if the reported measurement result of the associated AP is less than the threshold.

2. The method of claim 1, wherein the DRX suspend configuration further includes an interval of time for the suspending of the DRX.

3. The method of claim 1, further comprising receiving from the BS, a command for offloading of data traffic, from the Wi-Fi network to the cellular network.

4. The method of claim 1, further comprising receiving an indication of DRX resume from the BS.

5. The method of claim 4, wherein the indication of DRX resume corresponds to a DRX command media access control (MAC) sub-header.

6. The method of claim 4, further comprising resuming the DRX according to the indication of DRX resume.

7. A user equipment (UE) which is connected to a base station (BS) of a cellular network and an access point (AP) of a Wi-Fi network, wherein the BS and the AP are connected to each other, the UE comprising:

a memory;

a transceiver; and a processor coupled to the memory and the transceiver, and configured to:

control the transceiver to receive a discontinuous reception (DRX) suspend configuration including a DRX suspend triggering condition and a threshold related to the DRX suspend triggering condition, wherein the DRX suspend triggering condition indicates a condition that a measurement result of an associated AP becomes less than the threshold, from the BS, detect an occurrence of the DRX suspend triggering condition, reporting the measurement result of the associated AP to the associated AP when the DRX suspend triggering condition is met, and suspend a DRX;

receive a neighbor AP measurement configuration of a neighbor AP from the BS, with the DRX suspended, and resume the DRX, upon receiving the neighbor AP measurement configuration, wherein the neighbor AP measurement configuration includes information on which neighbor AP will be measured and when the measurement result will be reported, wherein the neighbor AP measurement configuration is determined, by the BS, to be transmitted if the reported measurement result of the associated AP is less than the threshold.

8. The UE of claim 7, wherein the DRX suspend configuration further includes an interval of time for the suspending of the DRX.

9. The UE of claim 7, wherein the processor is further configured to control the transceiver to receive from the BS, a command for offloading of data traffic, from the Wi-Fi network to the cellular network.

10. The UE of claim 7, wherein the processor is further configured to control the transceiver to receive an indication of DRX resume from the BS.

11. The UE of claim 10, wherein the indication of DRX resume corresponds to a DRX command media access control (MAC) sub-header.

12. The UE of claim 10, wherein the processor is further configured to resume the DRX according to the indication of DRX resume.

* * * * *